UNITED STATES PATENT OFFICE.

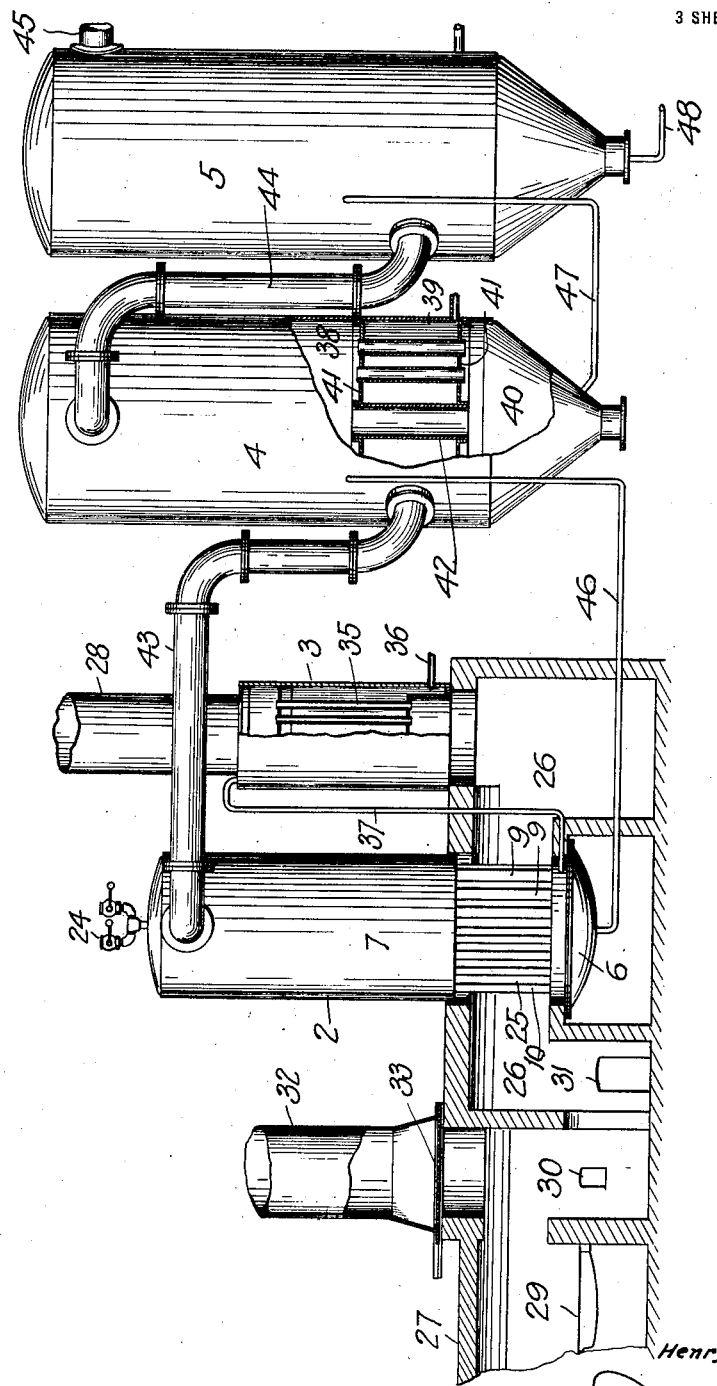

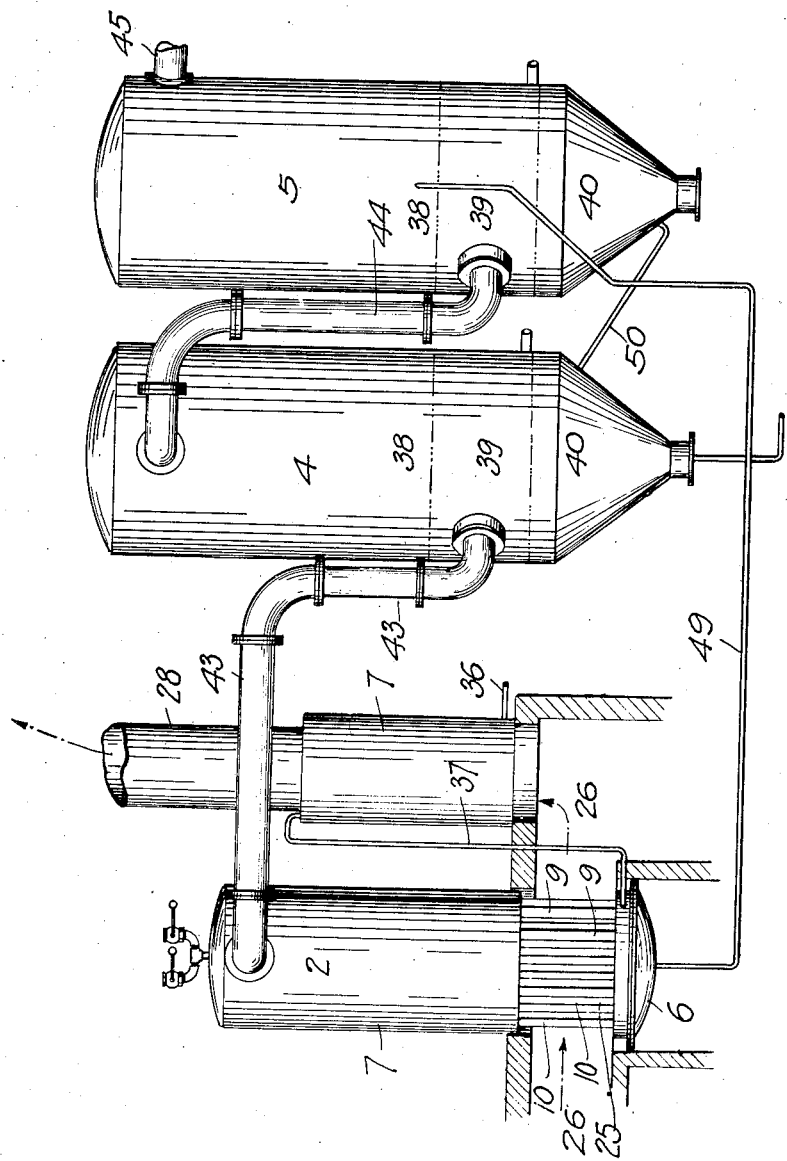

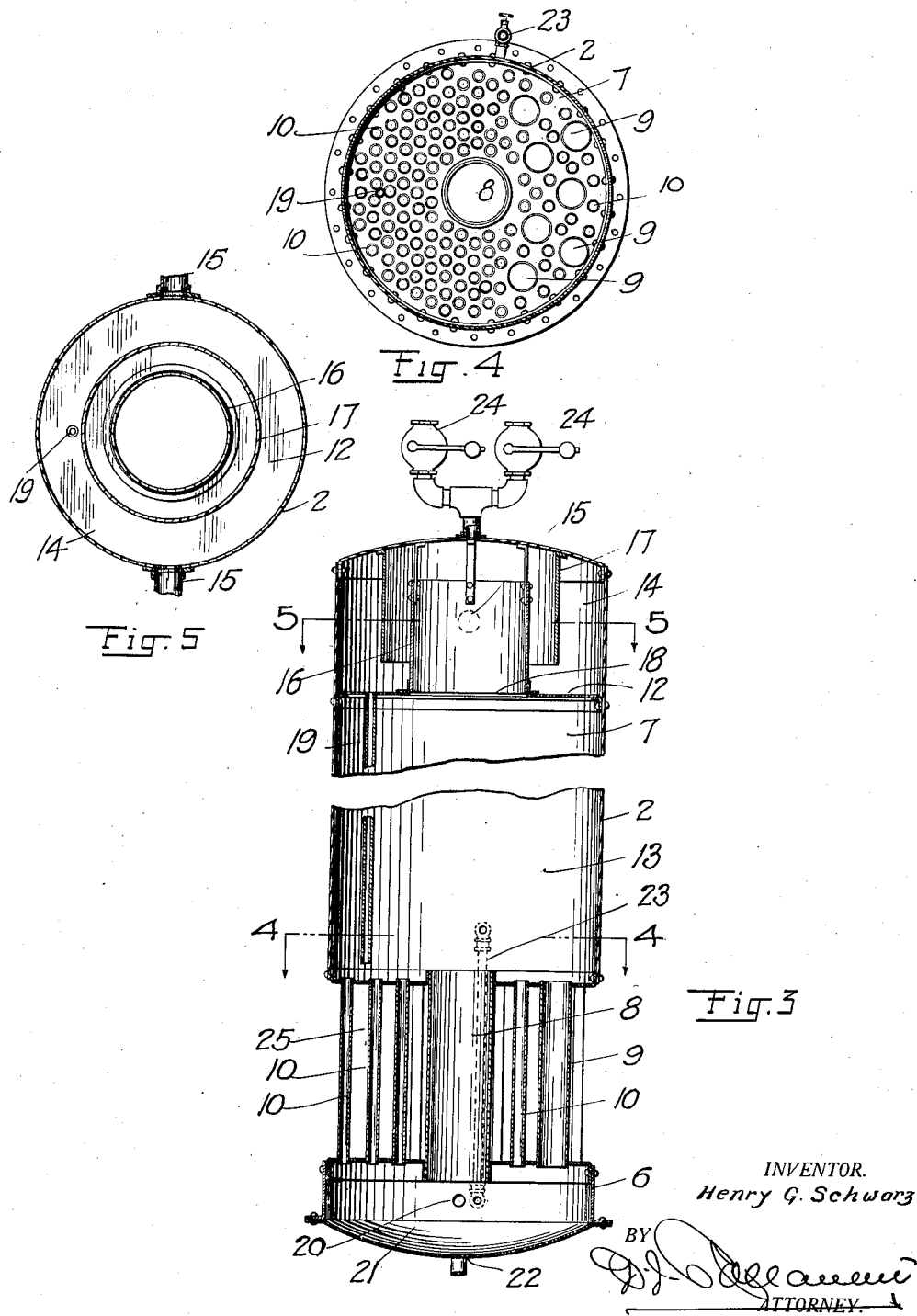

HENRY G. SCHWARZ, OF DENVER, COLORADO.

EVAPORATOR.

1,385,499.  Specification of Letters Patent.  Patented July 26, 1921.

Application filed June 25, 1918. Serial No. 241,890.

*To all whom it may concern:*

Be it known that I, HENRY G. SCHWARZ, a citizen of the United States, residing at Denver, in the county of Denver and State of Colorado, have invented certain new and useful Improvements in Evaporators, of which the following is a specification.

My invention relates to evaporators of the type used for the concentration of liquid by the application of heat.

It is particularly adapted for use in recovering solids from potash-bearing liquid and in concentrating waste waters from molasses in a desugarizing process, and its primary object is to provide an apparatus of very simple construction in which liquids are rapidly concentrated by the heat of gases derived from the combustion of fuel in either a specially constructed furnace or a conveniently located boiler or by the heat of waste gases from oil-engines, gas-engines or internal-combustion engines, which have a comparatively high temperature.

The concentration of liquids in evaporators of the type mentioned has heretofore been effected by using either live steam from boilers, exhaust steam from engines or pumps, or vapors obtained from other sources.

In plants requiring the evaporation of large quantities of liquid there is but seldom a sufficient supply of exhaust steam to produce the necessary heat, and special boilers are required for the generation of steam by which to supplement the vapors derived from other sources.

The provision of special boilers for this purpose not only involves considerable expense of installation, maintenance and operation but their production is under the present abnormal conditions restricted to an extent that many projects in which the concentration of liquids is an essential, are delayed or temporarily abandoned.

By the use of my improved evaporator these difficulties are successfully avoided not only owing to the fact that a supply of fuel gases can be obtained at nearly any location without the necessity of installing and maintaining costly structures, but more particularly by reason of its peculiar construction and arrangement of parts by which advantage is taken of practically all the heat units contained in the flue gases by which the evaporation process is effected.

An embodiment of my invention has been shown in the accompanying drawings in which like characters of reference designate corresponding parts throughout the several views and in which—

Figure 1 represents an elevation of an evaporating plant constructed in accordance with my invention, Fig. 2, is a similar elevation showing a modified arrangement of the connections between the elements of the plant, Fig. 3, a vertical section through my improved evaporator, Fig. 4, a transverse section along the line 4—4, Fig. 3, and Fig. 5, a similar section taken on the line 5—5, Fig. 3.

Referring to the drawings, the reference numeral 2 designates an evaporator of my improved construction which in Figs. 1 and 2 has been shown in association with a preheater 3 and two auxiliary evaporating devices 4 and 5 which are coöperatively connected so as to obtain the most economical results from the use of the gases by which the evaporation process is effected.

My improved evaporator may, however, be used separate from the preheater and independent of supplemental evaporating devices or it may operate in connection with one or as many of these devices as may be required to concentrate the liquid under treatment to the desired density.

The evaporator as best shown in Figs. 3 to 5 of the drawings, comprises a preferably cylindrical container made up of a lower or bottom section 6 and an upper or body-section 7 which are connected by a series of upright conduits 8, 9 and 10.

The body-section of the container constitutes the separating chamber of the device which is divided by a horizontal partition 12 into a lower compartment 13 in which the vapors generated in the conduits rise out of the liquid, and an upper compartment 14 in which the liquid entrained by the rising vapors is retained and from which the vapors escape through one or more outlets 15 either in the open or to a condenser or a secondary evaporating device.

The upper compartment contains two concentric and reversely extending cylindrical baffles 16 and 17 the inner one of which connects with a central opening 18 in the partition 12.

The vapors rising through the interior baffle are thus compelled to abruptly change their course toward the outlets 15, with the result that the entrained liquid is collected in the space of the compartment surrounding the central baffle.

The liquid is discharged from the upper compartment of the separating chamber through one or more tubes 19 which extend downwardly from apertures in the partition, to the bottom portion of the lower compartment of the same.

The last-mentioned compartment is of considerable height compared with its diameter to lessen as much as possible entrainment of liquid by the vapors which rise from the foaming mass emitted from the conduits at the lower end thereof.

The lower section constitutes a comparatively shallow chamber 21 which serves in the operation of the device to provide a space for the circulation of liquid between the several conduits and to receive the liquid which is fed thereinto through an opening 20.

In case the evaporator is used in connection with auxiliary evaporating devices the lower chamber has an outlet 22 through which part of its liquid contents are discharged.

I desire it understood that it is not positively essential in the operation of my invention to feed the liquid under treatment into the lower chamber and that under certain conditions it may be admitted to the lower portion of the upper chamber.

A gage glass 23 connects with openings in the upper and lower chambers of the evaporator to show the liquid-level and one or more safety valves 24 of full capacity area and comparatively low pressure, are applied to the top of the upper chamber.

The space 25 between the two chambers 21 and 7 in which the connecting conduits extend, constitutes the heating chamber of the evaporator and in practice forms part of a flue 26 through which the volatilized products of combustion escaping from the furnace 27, pass to a stack 28.

In Fig. 1 of the drawings the flue 26 has been shown in connection with a fire-box 29 of the furnace, which for the proper regulation of temperatures and for rapid cooling in case of emergency, is provided with air doors 30 and 31.

The furnace is also provided with an emergency stack 32 which normally is closed by a sliding gate 33 and which permits of the rapid escape of gases into the open when it is desired to cool the evaporator.

The conduits which connect the upper and lower chambers of the evaporator are of different diameters and they are arranged so that those of lesser diameter are fully exposed to the calorific effect of the gases escaping from the fire-box of the furnace, while those of larger diameter are placed so as to be engaged by the gases only after they have heated the others.

In the construction shown in Figs. 2 to 4 of the drawings, the portion of the heating chamber of the evaporator between its upper and lower chambers, foremost with relation to the direction in which the gases arising from the fire in the furnace pass through the flue, contains conduits of small diameter only, while the more rearward part of the chamber contains a number of conduits of larger diameter surrounded by conduits of the same size as those contained in the forward portion of the same.

The conduit 8 which in diameter exceeds any of the others, is placed in the center of the heating space and is like the other larger conduits 9, surrounded by conduits 10 of small diameter.

In the operation of the evaporator the liquid fed into the lower chamber is forced upwardly through the small conduits 10 and partially converted into vapors by the heat of the gases constantly passing through the flue.

The unvaporized liquid upon entering the upper chamber of the vaporizer returns to the lower chamber of the same through the larger conduits 8 and 9 which by reason of their sheltered position are maintained at a lower temperature than the others, and a circulatory movement of the liquid is thus attained which greatly aids in effecting its rapid and complete evaporation.

The vapors rising out of the foaming mass in the lower compartment of the separating chamber pass upwardly through the central baffle in the upper compartment of the same and through the space between this baffle and the other to the outlets 15 which may connect with the atmosphere, with a condenser or with a secondary evaporating device.

The sharp turns in the course of the vapors to the outlets causes the entrained liquid to be separated therefrom and this liquid collecting in the lower portion of the upper compartment returns to the bottom portion of the other compartment through the tube 19.

In order to derive the greatest possible benefit from the use of the heat-imparting gases passing through the flue, the preheater 3 may be placed in the breeching of the flue between the heating chamber of the evaporator and the stack 28.

This preheater may be of any suitable construction, preference being given to an arrangement such as shown in the drawings in which a plurality of vertical tubes 35 passing through a cylindrical container, form conjointly a connection for the flow of gases between the flue 26 and the stack.

The liquid under treatment enters the bottom of the preheater through a pipe 36 and is discharged from the top of the same through a pipe 37 which connects with the feed opening 20 of the evaporator.

It will be observed that by this arrangement of the preheater with relation to the evaporator the liquid is heated before it enters the lower part thereof, by the same gases which afterward cause its evaporation and the concentration of the liquid is in consequence effected with the most economical use of the products of combustion escaping from the fire-box of the furnace.

In a multiple effect evaporization system, such as is shown in Figs. 1 and 2 of the drawings, the vapors produced in my improved evaporator are utilized to increase the degree of concentration of the liquid in one or more auxiliary evaporating devices.

These devices may be of any suitable construction those shown in the drawings being composed of a cylindrical container which is divided into three compartments 38, 39 and 40 by two horizontal flue sheets 41.

The upper and lower compartments are connected by a series of conduits 42 which pass through the middle compartment between the two sheets and the upper compartment is sufficiently high to prevent the entrainment of liquid by the vapors escaping through an opening at its top. The gases escaping from the upper compartment of the separating chamber of the primary evaporator are conducted to the middle compartment of the second evaporating device 4 through a conduit 43.

If another auxiliary evaporating device 5 is employed the vapors discharged from the first auxiliary evaporator 4 are conducted through a pipe 44 to the middle compartment of the second auxiliary evaporator and the discharge opening 45 in the top of the latter may be connected with a condenser or with the atmosphere.

Under ordinary conditions when it is desired to concentrate a liquid by a succession of evaporative actions, the lower chamber of the initial evaporation body is connected with the upper compartment of the second auxiliary evaporator by a pipe 46, and the lower chamber of the first auxiliary evaporator connects with the upper compartment of the second auxiliary evaporator by a pipe 47.

By this arrangement the liquid is conducted from one evaporator to the other at progressively increasing degrees of density and the final product is discharged from the last evaporator of the series through a pipe 48 connected with an opening in the bottom thereof.

If it is desired to deliver the final product of the condensation process at a higher temperature, as is advisable in the concentration of potash solution in order to prevent crystallization in the pipe line to the drier, the second auxiliary evaporating device receives the liquid discharged from the primary evaporator through a pipe connection 49 shown in Fig. 2 and the liquid leaving the lower portion of the second auxiliary evaporator enters the first auxiliary evaporator through a pipe 50.

Having thus described my improved evaporator and the system in which it is employed, in the best form at present known to me, I desire it understood that variations in the arrangement of the coöperative devices and their connections and modifications in the construction of the same may be resorted to within the spirit of my invention as defined in the appended claims.

The arrangement of the heating and circulating tubes between the chambers of the evaporator may for example be varied from that shown in the drawings, and the tubes may be made larger or smaller as is best adapted to obtain a rapid evaporating action and a continuous and free circulatory movement of the liquid.

The cross-sectional form of the evaporator and the proportions of its chambers and compartments may also be varied to adapt it for the particular purpose for which it is used, it having been found that under certain conditions evaporators of rectangular section are advantageous over those which are of the cylindrical form illustrated in the drawings.

Having thus described my invention what I claim and desire to secure by Letters Patent is:

1. In a system for the concentration of liquids, the combination of a substantially horizontal flue for the conveyance of gases to a point of escape, and an evaporator having upper and lower chambers, tubes which connect the chambers and pass transversely through the flue, an opening in the upper chamber for the escape of vapors, and an opening in the lower chamber for the discharge of material of increased density, a preheater disposed to be heated by gases moving through the flue after they have passed the tubes of the evaporator, a connection between the preheater and the evaporator for conveying heated liquid to the lower chamber, and a conduit for feeding a liquid to the pre-heater.

2. In a system for the concentration of liquids, the combination of a substantially horizontal flue, an evaporator comprising two closed chambers disposed respectively above and below a determined portion of the flue, the upper chamber having an opening for the escape of vapors and the lower chamber having an opening for the discharge of material of increased density, circulation tubes and heating tubes of relatively smaller diameter, which connect the chambers and pass transversely through the flue, the heating tubes being disposed foremost with relation to the direction of the flow of gases from the furnace whereby to shelter the circulation tubes, and a conduit for feeding liquid to the evaporator.

3. An evaporator of the character described comprising upper and lower chambers separated by a space, a flue connecting with said space at opposite ends thereof and tubes connecting the chambers and passing through the space, there being a central tube, a number of smaller tubes at different points around the same, and a number of still smaller tubes placed in front of the other tubes with relation to the direction of the flow of gases through the flue.

In testimony whereof I have affixed my signature.

HENRY G. SCHWARZ.